United States Patent [19]

Heimerl

[11] 4,341,547
[45] Jul. 27, 1982

[54] APPARATUS FOR ENCLOSING HIGHLY RADIOACTIVE WASTE MATERIAL IN A GLASS MELT

[75] Inventor: Wilfried C. Heimerl, Mol, Belgium

[73] Assignee: Deutsche Gesellschaft fur Wiederaufarbeitung, Fed. Rep. of Germany

[21] Appl. No.: 165,214

[22] Filed: Jul. 1, 1980

[30] Foreign Application Priority Data

Jul. 10, 1979 [DE] Fed. Rep. of Germany ....... 2927795

[51] Int. Cl.³ .......................... C03B 5/28; C03B 7/18
[52] U.S. Cl. ...................................... 65/165; 65/124; 65/213
[58] Field of Search .................... 252/628, 629; 65/62, 65/124, 125, 137, 210, 213, 326, 324, 329, 130, 165

[56] References Cited

U.S. PATENT DOCUMENTS

| | | | |
|---|---|---|---|
| 2,019,046 | 10/1935 | Delpech | 65/210 X |
| 2,047,913 | 7/1936 | Holcombe | 65/124 |
| 2,310,715 | 2/1943 | Soubier | 65/130 X |
| 3,880,634 | 4/1975 | Deeg et al. | 65/124 X |

OTHER PUBLICATIONS

Kaufmann et al., "Keramische Schmelzanlage ..." Atom wirtschaft, 22 (7/8), Jul./Aug. 1977, pp. 389–390.
Heimerl; "Neue Weg zur Verglasung Hochradioaktiver Abfalle"; Chemie-Technik, vol. 5, No. 10, 1976, pp. 407–410.

*Primary Examiner*—Richard V. Fisher
*Attorney, Agent, or Firm*—Allegretti, Newitt, Witcoff & McAndrews

[57] ABSTRACT

A method and apparatus for encapsulating or embedding highly radioactive waste in glass within an ultimate storage container in which molten glass is transferred from a melting furnace to the container by means of suction. The container is evacuated, and a sealed suction tube connecting to the container is immersed in the molten glass containing the waste, whereupon the seal is broken and the molten glass flows under the force of atmospheric pressure into the container. The operation may be carried out by remote controls.

8 Claims, 17 Drawing Figures

APPARATUS FOR ENCLOSING HIGHLY RADIOACTIVE WASTE MATERIAL IN A GLASS MELT

The invention relates to a method for enclosing or encapsulating highly radioactive waste material in a storage container filled with a glass melt and an apparatus for carrying out the method.

PRIOR ART

When using electrically heated ceramic melting furnaces (at the present time still simulated) for the fixation of highly radioactive waste (HAW) in glass, essentially two operational procedures have been previously followed to convey the glass melt into the ultimate storage container (see C. C. Chapman, J. L. Buelt, "The Use of a Continuous Glass Melter in Immobilization of Radioactive Defense Waste" PNL-SA-6867, August 1978, U.S.A.; W. Heimerl, "Neue Weg zur Verglasung Hochradioaktiver Abfalle", Chemie-Technik, Vol. 5, 1976, No. 10, p. 407–410; F. Kaufmann et al., "Keramische Schmelzanlage zur Verfestigung von HAW-Losungen in Borosilikatglas", Atomwirtschaft 22 (7/8), p. 389–390, July/August 1977):
1. a bottom discharge system,
2. an overflow system.

The bottom discharge system consists basically of an opening in the furnace floor or bottom in which the flow of glass may be controlled either by freezing by appropriate cooling, or by melting by applying heat.

In the overflow system, the melt is discharged through a second chamber or a channel in communication on the furnace floor with the main chamber.

When rising above a given filling level, the glass overflows. Both systems are afflicted with different shortcomings which are inherent in the particular physical principles and which may cause severe problems, especially in view of a remotely controlled operation required in handling radioactive material.

The disadvantages of the bottom discharge system are as follows:
1. In the event of a disturbance, an uncontrollable complete discharging of the furnace is conceivable.
2. The service life is too short and in the individual case often cannot be sufficiently assessed to any satisfactory degree of exactness (material problems).
3. When using Inconel, the operational temperature is only about 100° C. lower than the temperature at which destruction of the discharge area sets in.
4. A remotely-controlled replacement job is extremely difficult (manipulation at the underside of the furnace).
5. A sufficiently big fragment broken off from the refractory lining can obstruct the discharge opening.
6. The refractory brickwork of the furnace floor is subject to extreme wear by the periodic heating and cooling of the bottom discharge area.

The disadvantages of the overflow system are as follows:
1. Between main chamber and overflow chamber a complete pressure equilibrium must be maintained at all times in order to forestall any contingency resulting in an uncontrolled discharge of glass.
2. Sediments may be caused to form which may ultimately clog the overflow. At small throughputs, a sedimentation even in the overflow itself may occur because of the very low upwardly directed flow rate.
3. The rate of tapping is in the range of the quantity of glass produced per unit of time. This makes for a very time consuming operation.
4. The replacement of ultimate storage containers creates problems (at a continuous glass discharge).
5. For a complete evacuation of the furnace, a bottom outlet opening is necessary.

THE INVENTION

It is the object of the present invention to provide a method as set forth herein and a device for carrying out the method to overcome the disadvantages of prior filling techniques and provide a novel and improved filling technique which assures ease and safety of handling.

The method and apparatus of the present invention has several advantages over the state of the art. Each ultimate storage container has its own filling means (suction or filler tube), integrally connected thereto. The replacement of any such means fixedly installed on the furnace is thereby eliminated. The period of operation can be set to be extremely short to avoid any problems with respect to the material from which the suction tube is made. In accordance with the invention, sediments are readily removed by suction so that they will cause no problem. An overfilling of the ultimate storage containers is no longer possible. No monitoring of the filling level during the filling operation is required. By directly conveying the glass melt into the sealed ultimate storage container, waste gas problems are eliminated. It is no longer necessary to provide supplemental heating and/or cooling means for the discharge operation. In the event of a breakdown in the discharge suction operation, no emergency will be created because nothing happens. This may occur, for instance, when the pressure in the ultimate storage container is not low enough. In this case, it is suggested to simply use another container. The invention provides a substantially enhanced degree of operational safety as well as an essential simplification of the filling technique.

The method according to the invention may also be employed in emergencies with any ceramic furnace, for instance, in the case of failure of all other usually employed discharge means, or in the event of a buildup of sediments. The method and apparatus of the invention may be employed in the complete evacuation of a furnace with overflow system, the one requirement merely being that an appropriate opening in the upper portion of the furnace be present.

Further novel and advantageous embodiments and features of the method and apparatus of the invention are set forth in the subclaims.

THE DRAWINGS

The invention will be described in more detail by way of example, with reference to the embodiments illustrated diagramatically in the accompanying drawings, in which.

DETAILED DESCRIPTION

Figures 1, 2:
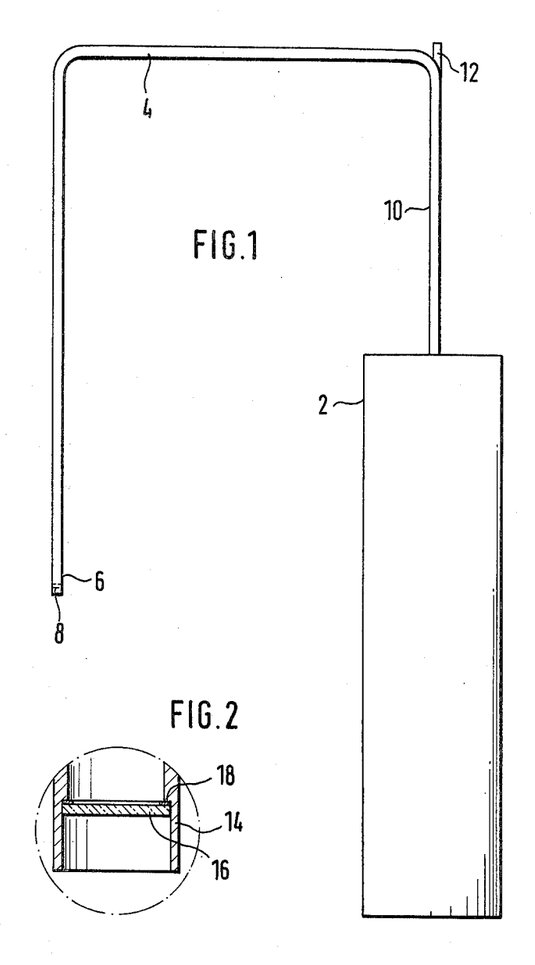
FIG. 1 is a schematic view of an ultimate storage container provided with a suction or filler tube.
FIG. 2 is a detailed view of the suction opening of the suction tube, fitted with a glass stopper.
Figure 11:
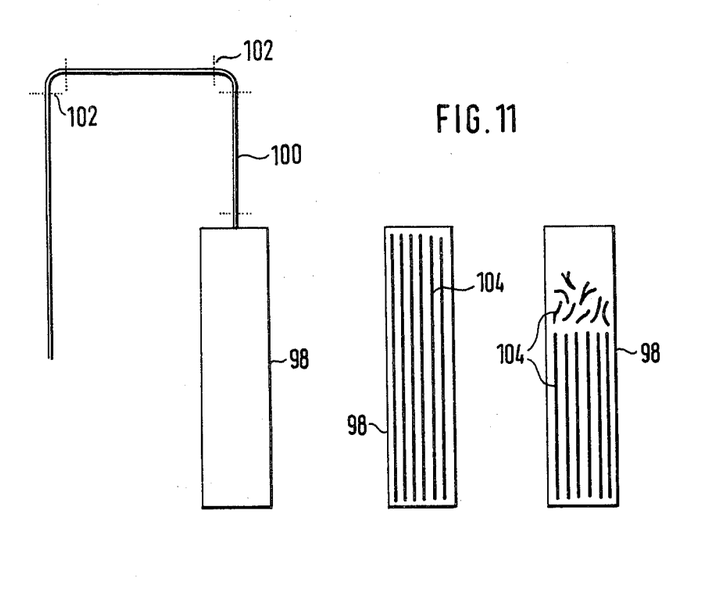
FIG. 11 is a schematic representation of an ultimate storage container including suction tubing provided with break lines for separating and disassembling the suction tubing, and two other representations of an ultimate storage container filled with sections of the disassembled suction pipe.
Figure 13:
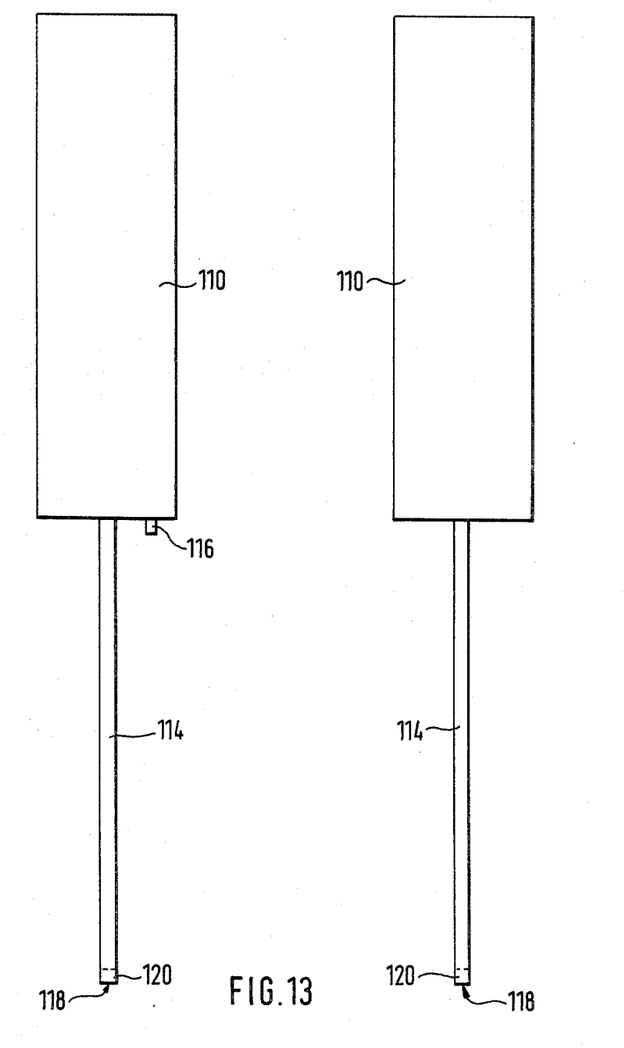
FIG. 13 illustrates another embodiment of an ultimate storage container with a downwardly-extending suction tube, and with or without, respectively, evacuation connecting fittings.
Figure 16:
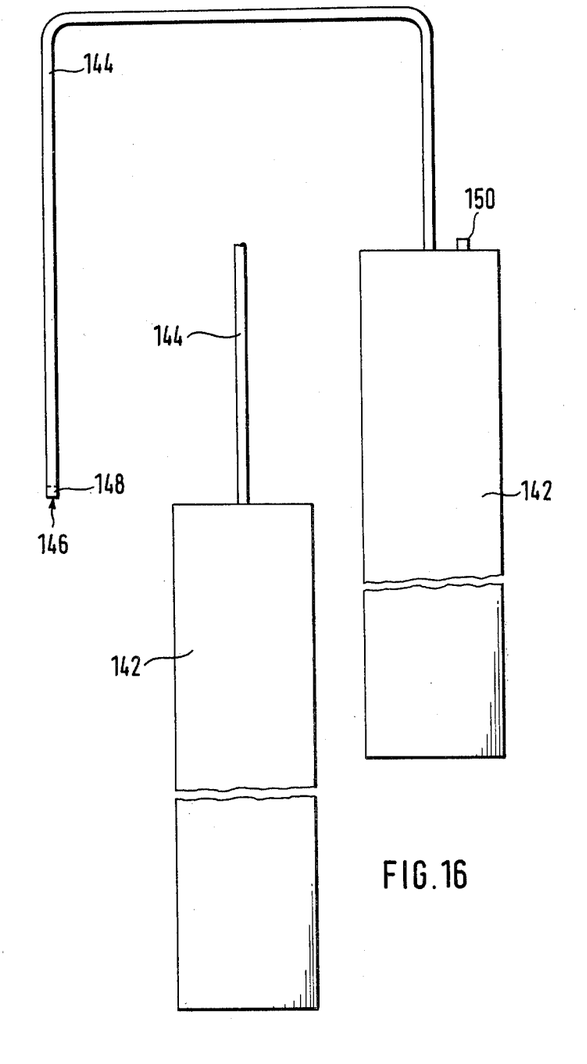
FIG. 16 shows an ultimate storage container similar to that of FIG. 1, one embodiment having a separate evacuation connector and one embodiment being without one.

Referring to the drawings, FIG. 1 illustrates an ultimate storage container 2 provided with a U-shaped suction pipe 4 which is fitted at its suction end 6 with a glass stopper 8. Suction pipe 4 and similar pipes are referred to in the claims as "filler tubes." The stopper 8 is made of a low melting glass. The leg 10 of the U-shaped pipe 4 opens into the ultimate storage container 2 and is provided with a closable tubular connecting piece 12 for connection to a vacuum pipe or other outside vacuum source for the purpose of evacuating the ultimate storage container 2. The connecting tube 12 may also be provided directly on the ultimate storage container 2, separately from the suction pipe 4, or it may be eliminated completely, as shown in FIGS. 13 and 16. In this case, the evacuation is achieved directly through the suction tube 4 prior to its being fitted with a glass stopper. The suction tube 4 may be provided with a number of nominal break points, as is indicated in FIG. 11. The purpose of these break points will be discussed below in conjunction with the description of FIG. 11.

FIG. 2 shows the suction opening 14 of the tube 4 of FIG. 1 fitted with a glass stopper 16. The interior lining of the suction tube 4 is partly offset in the region of the suction opening to form an annular shoulder 18. Connected to this shoulder 18 is the stopper 16 in the shape of a glass plate. When the suction end 14 of the tube 4 is lowered into the glass melt in the melting furnace, the low melting glass of the stopper is caused to melt and the glass melt in the melting chamber is given free passage out of the melting chamber and into the ultimate storage container.

Figure 3:
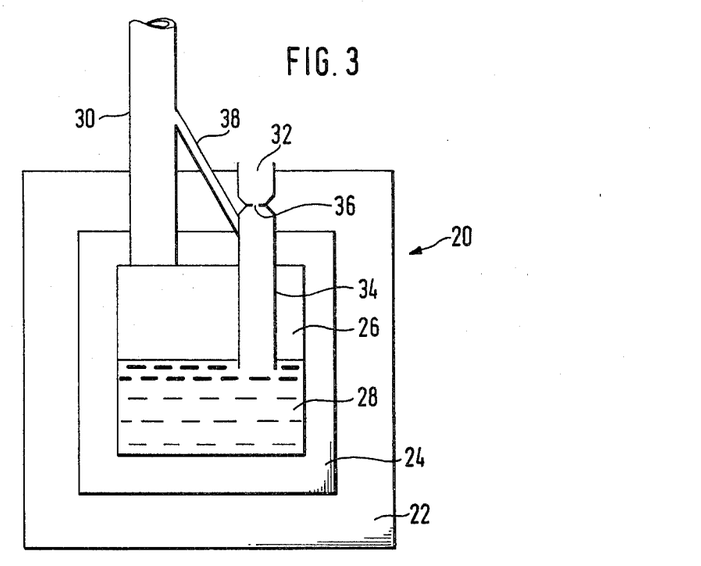
FIG. 3 is a diagrammatic representation of a first embodiment of a ceramic melting furnace having a suction pipe which extends into the melting chamber.
Figure 4:
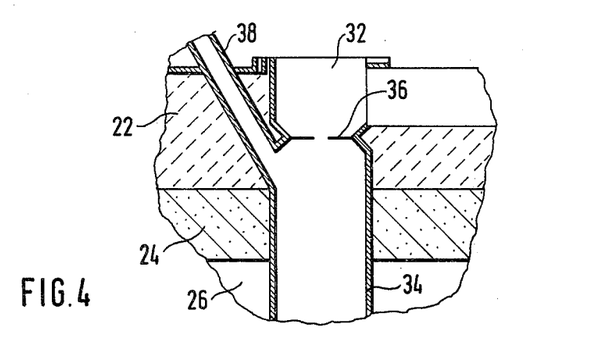
FIG. 4 is a detailed view in the region of the pipe outlet shown in FIG. 3.

The ceramic melting furnace 20 of FIG. 3 is provided with an outer wall 22 for thermal insulation and an inner wall 24 of refractory material. The ceramic wall 24 encloses a melting chamber 26 which contains the glass melt 28. The melting furnace 20 is so constructed as to be tightly sealed on all sides, with the exception of an exhaust pipe 30 projecting from the upper portion of the furnace and an inlet opening 32 for receiving the suction tube of the ultimate storage container. Pipe 34 of larger diameter than suction tube extends from the inlet opening 32 downward into the glass melt 28. The pipe 34 is fitted with a flexible closure member 36 which will be further described below with reference to FIGS. 8 to 10. A small diameter branch pipe 38 leads from the pipe 34 to the exhaust pipe 30. This is illustrated in greater detail in FIG. 4, for the sake of simplicity and clarity using the same reference numerals as in FIG. 3, so that the description of FIG. 3 will also apply to FIG. 4.

Figure 5:
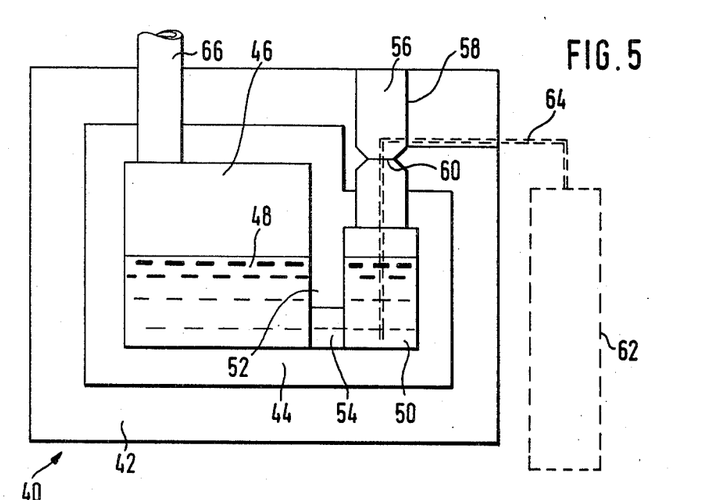
FIG. 5 is a diagrammatic view of a second embodiment of a ceramic melting furnace having a separate discharge chamber.

FIG. 5 illustrates another embodiment of a melting furnace 40. The melting furnace 40 likewise has an outer wall 42 for thermal insulation and an inner wall 44 of refractory material. In addition to the melting chamber 46 holding the glass melt 48, a separate suction chamber 50 is provided which is in communication with the melting chamber 46 by a passage 54 through the partition 52. Extending into the suction chamber 50 from an inlet opening 56 in the furnace wall is a pipe 58 which is fitted with a flexible closure member 60 in similar manner as in the embodiment of FIG. 4. The dash-dotted lines indicate an ultimate storage container 62 having a suction tube 64 in the filling position. Leading from the melting chamber 46 into the atmosphere is an exhaust pipe 66.

Figure 6:
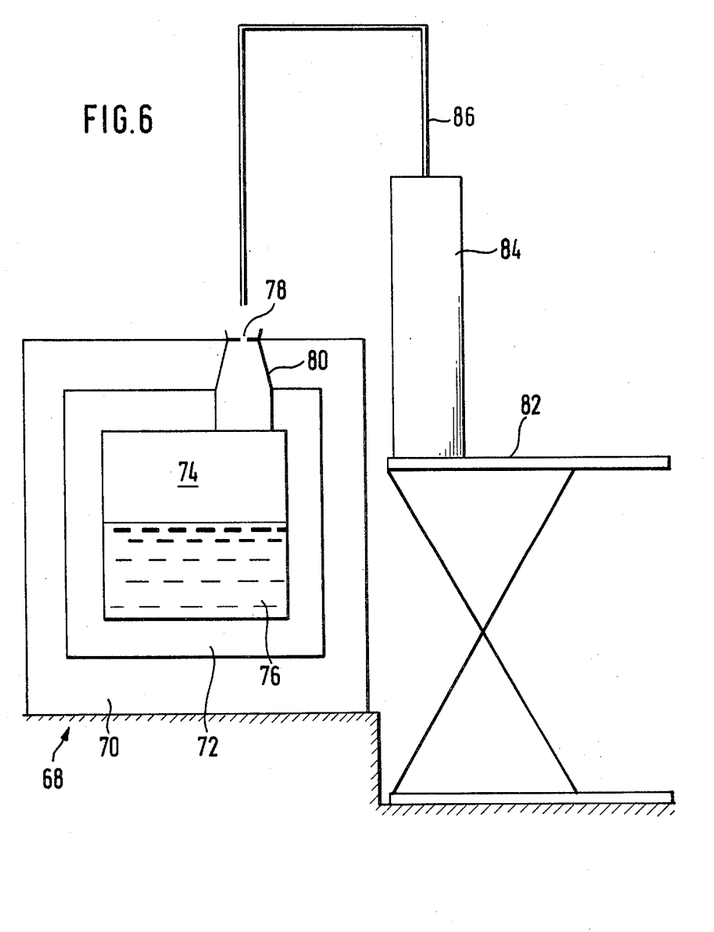
FIG. 6 is a schematic representation of a glass melting furnace and an ultimate storage container stationed on an elevator platform, prior to the start-up of the discharge-filling operation.
Figure 7:
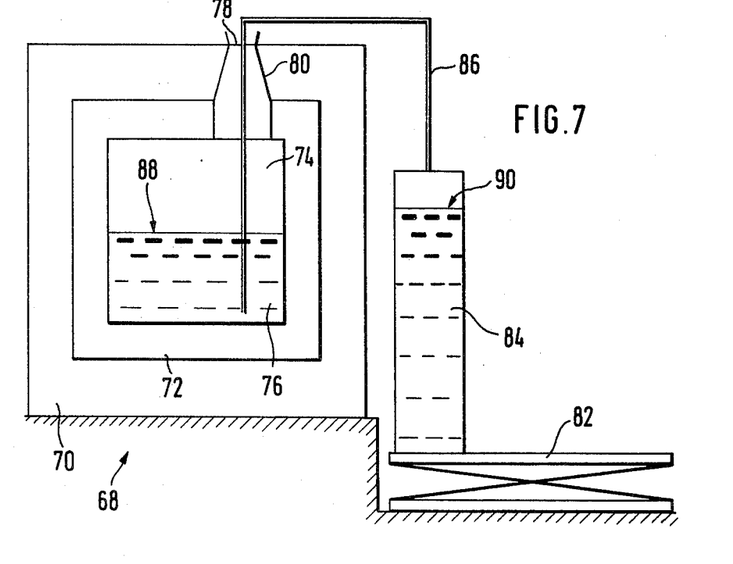
FIG. 7 shows the ceramic melting furnace and the ultimate storage container according to FIG. 6 lowered into the filling position.

Reference is now made to FIGS. 6 and 7 in which for the sake of simplicity and clarity, like reference numerals have been used for like parts. Both FIG. 6 and FIG. 7 illustrate schematically a melting furnace 68 having an outer wall 70 for thermal insulation and an inner ceramic wall 72. A melting chamber 74 holds the glass melt 76. A pipe 80 leads from an inlet opening 78 into the melting chamber.

An ultimate storage container 84 is placed on an elevator platform 82.

In FIG. 6, the ultimate storage container on the elevator is shown in an elevated position, ready to lower the suction tube through the inlet opening 78 into the melting chamber 75.

FIG. 7 illustrates the container 84 in the lowered position (filling position). In the operational stage illustrated, the glass melt 76 in the melting chamber 74 has reached the level 88, and the glass melt conveyed through the suction tube 86 into the ultimate storage container has reached the level 90. The relative position of the levels 88 and 90 with respect to each other depends on the magnitude of the reduced pressure in the ultimate storage container 84 as well as on the relative mutual position of the storage container and the furnace.

Figure 8:
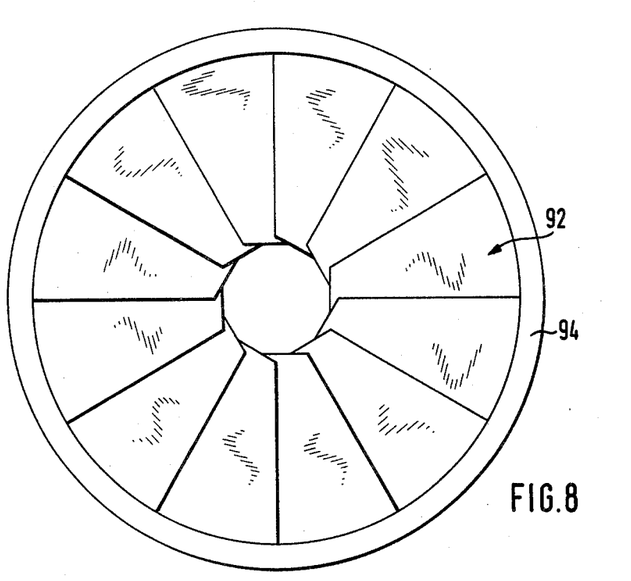
FIG. 8 shows a flexible closure member for the opening in the melting furnace provided for the insertion of the suction pipe.
Figure 9:
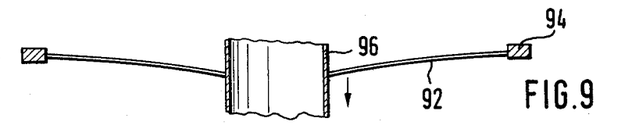
FIG. 9 is a schematic view of the closure member of FIG. 8 during the insertion of the suction pipe.
Figure 10:
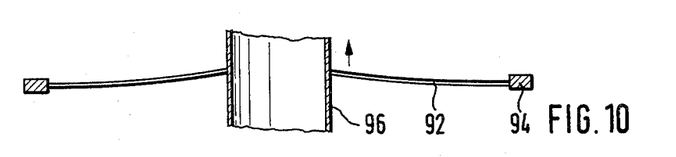
FIG. 10 is a schematic view of the flexible closure member of FIG. 8 during withdrawal of the suction pipe.

Reference is now made to FIGS. 8 to 10 in which like reference numerals are being used for like structural components. These figures show an adjustable closure member 92 for the inlet opening in the wall of the melting furnace or for the pipe extending through the inlet opening into the melting chamber, respectively 94 denotes the annular wall of the inlet opening and/or the wall of the pipe. The yieldable closure member is in the form of an iris diaphragm biased to closed position. As the suction pipe is being inserted into the inlet opening, it will be snugly engaged by the thin plates of the closure member which, in so doing, will slightly be pushed downwardly, as it is illustrated in FIG. 9.

FIG. 11 shows an ultimate storage container 98 having a suction pipe 100. The container 98 is provided with nominal break points 102. Upon breaking and fragmenting the suction pipe 100 into sections 104, the sections 104 are placed into an empty container, as will be seen from the illustrations of FIG. 11.

Figure 12:
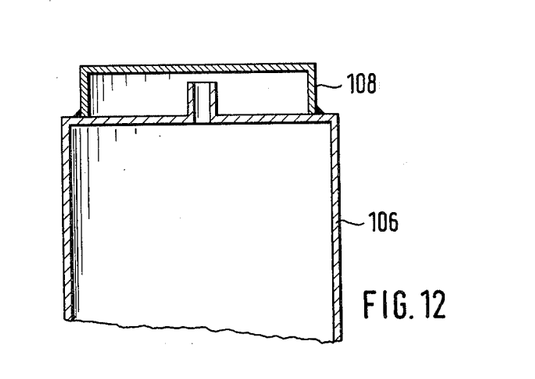
FIG. 12 is a schematic representation of the top of the ultimate storage container having a cover welded thereon.

FIG. 12 shows the upper portion of an ultimate storage container 106 subsequent to the removal of the suction tube and with a cover 108 welded thereon.

Figure 15:
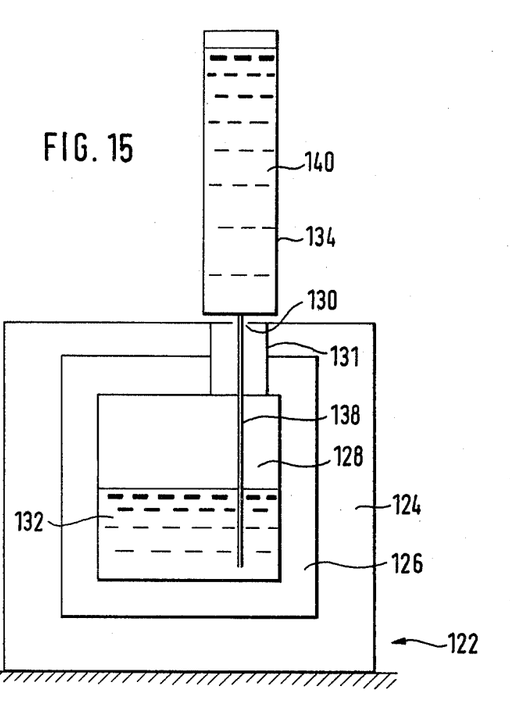
FIG. 15 shows the ultimate storage container of FIGS. 13 and 14 in the lowered suction position.

FIGS. 13 and 15 illustrate a further embodiment of an ultimate storage container having a suction tube attached thereto, and its operation in conjunction with a melting furnace.

FIG. 13 shows two embodiments of an ultimate storage container 110. Each is provided with a suction tube 114, the suction opening 118 of which being adapted to be sealed by a glass stopper 120. One embodiment includes an evacuation tube 116 which, however, may be dispensed with, as it is in the case of the second embodiment shown in FIG. 13. In that case, the evacuation of the container 110 is effected through the suction tube 114 prior to its being fitted with the glass stopper 120.

Figure 14:
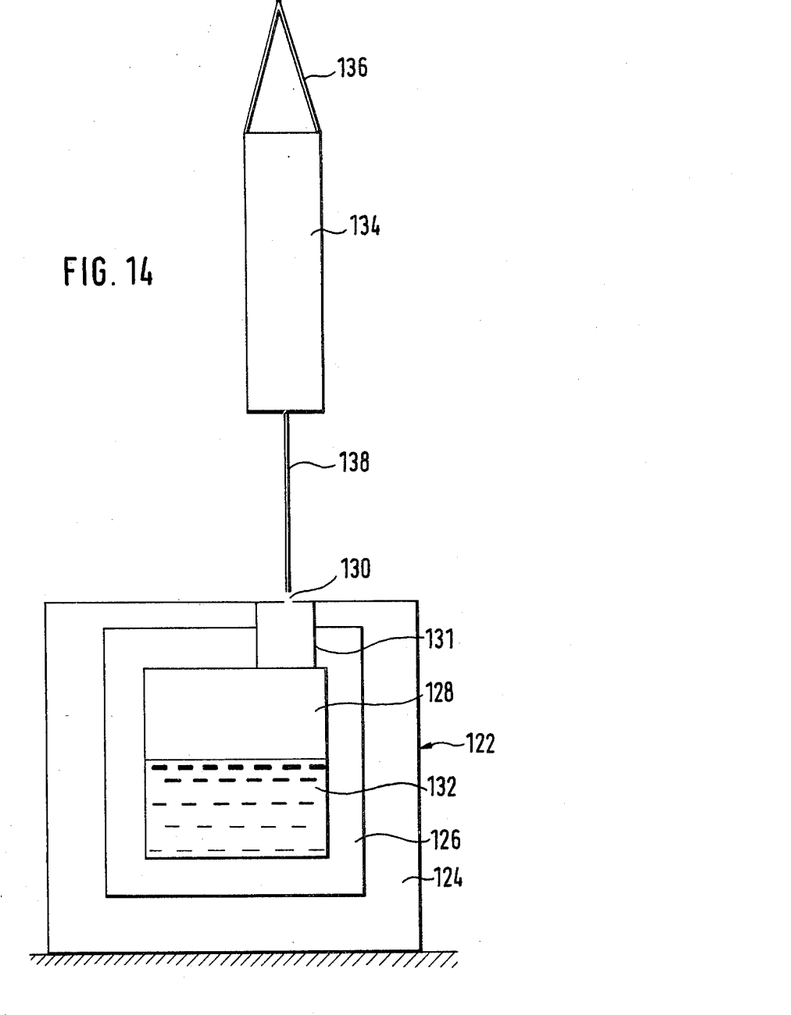
FIG. 14 shows the evacuated ultimate storage container according to FIG. 13 in a position above a melting furnace, prior to insertion of the suction tube of the storage container into the melting chamber.

FIGS. 14 and 15 show the container of FIG. 13 in operation at a melting furnace 122. For simplicity's sake, in FIGS. 14 and 15 like structural components are designated by like reference numerals.

Here again, the melting furnace 122 has an outer wall 124 for thermal insulation and an inner wall 126 of refractory material. The interior of the melting furnace comprises a melting chamber 128 which is accessible through an inlet opening 130 in pipe 131. The glass melt 132 is contained in the melting chamber 128. The evacuated ultimate storage container 134 with its suction tube 138 is positioned, with the aid of a suspension device 136, above the inlet opening 130 of the melting furnace 122.

FIG. 15 shows the storage container 134 lowered to an extent that its suction tube 138 penetrates into the glass melt 132 and melts the plug in the end of the tube. The container 134 is shown in its filled condition. A portion 140 of the glass melt 132 has been sucked up into the container 134 by reason of the reduced pressure within the container. The use of the ultimate storage container 134 is not limited to the type of furnace illustrated in FIG. 15. It will be apparent that the container may also be used with other furnace models such as, for example, the furnaces 20 and 40 shown in FIGS. 3 and 5, respectively.

FIG. 16 shows a further embodiment of an ultimate storage container 142 having a U-shaped suction tube 144 the suction opening 146 of which may be sealed by a glass stopper 148. The container 142 is provided with a separate closable tubular connecting fitting 150. Both the suction tube and the tubular connector open into the top of the container 142. As will be seen from the second embodiment of the container shown in FIG. 16, the connecting fitting 150 may also be entirely eliminated. In that case, evacuation of the ultimate storage container is effected through the U-shaped suction tube prior to inserting the glass stopper.

Figure 17:
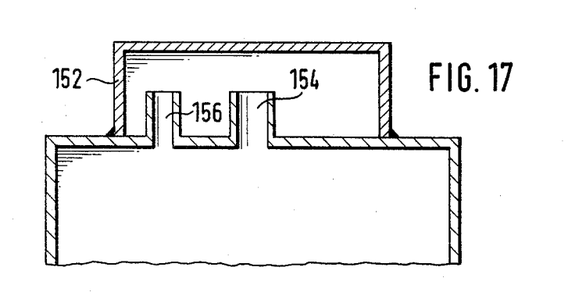
FIG. 17 shows the ultimate storage container of FIG. 16 in its filled condition with a cover welded thereon.

FIG. 17 shows the upper portion of the ultimate storage container according to FIG. 16, having a cover 152 welded thereon. This cover 152 is directly welded on site to the top of the ultimate storage container, immediately following the completion of the filling operation, to seal the suction or filler tube 154 and the evacuation tube 156.

The ultimate storage container shown in FIGS. 13, 14 and 15 is preferably used for a suction height of maximum 2 to 3 meters, depending on the density of the glass melt. For storage containers of greater length, for instance longer than 1.2 to 1.5 m, an embodiment of the container with suction tube as shown in FIGS. 1, 6, 7 and 16 is preferable. In these embodiments, the container, upon lowering the suction tube into the glass melt, is then positioned adjacent to one side of the furnace.

The process of filling the ultimate storage container with the material from the ceramic melting furnace is as follows. The suction opening of the suction tube of the storage container is sealed with a glass stopper, as shown in FIGS. 1, 2, 13 and 16. Thereupon the storage container is evacuated in a cold environment (outside the hot cell) through the evacuation tube and the evacuation connecting tube is subsequently sealed. If a container is used which has no tubular evacuation fitting, the evacuation of the container is accomplished through the suction tube prior to fitting it with a glass stopper. The storage container is now ready to be filled and may be placed in the cell in such a manner that the suction opening of the suction tube is positioned above the inlet opening in the wall of the melting furnace, as illustrated in FIGS. 6 and 14.

Thereupon the ultimate storage container is lowered to an extent that the opening of the suction tube is positioned immediately above the bottom of the melting chamber of the furnace (approximately 2 to 3 cm above the bottom) as shown in FIGS. 7 and 15. By providing the furnace floor with a trough-like depression (not illustrated) at the point of immersion of the suction pipe, the suction opening may be lowered directly down to the overall level of the furnace floor.

As the suction tube is immersed in the glass melt, the glass stopper sealing the opening is being melted. The reduced pressure within the ultimate storage container then causes the glass melt to be sucked up from the melting chamber of the furnace to be conveyed to and fill the container within a relatively short period of time. With a quick suction action, the latent heat of the molten glass is sufficient to prevent the glass melt from solidifying inside the suction tube. If deemed advisable, however, supplemental heating may be applied.

If necessary, or to speed up the suction operation, the ultimate storage container may be connected to an auxiliary vacuum source.

Upon completion of the filling operation, the suction tube, especially in the embodiment according to FIGS. 15 to 15, is subjected to spot cooling to bring about a solidification of the glass melt inside the suction pipe so as to form a glass plug to prevent the glass melt from flowing out of the storage container when the container is raised. Normally, the natural cooling off following the completion of the filling operation is already sufficient to form a glass plug. Thereafter, the ultimate storage container is raised, is slowly cooled and is taken to a special disassembly cell. In this disassembly cell, the suction tube is cut off from the storage container, along the nominal break lines or points provided on the suction tube, as shown in FIG. 11. The separation of the suction tube may be done mechanically or by burning. The suction pipe is relatively thin-walled and may be made of a standard grade steel.

When the suction tube has been removed, the ultimate storage container is sealed by a cover which is preferably welded onto the container, as shown in FIGS. 12 and 17.

The individual contaminated sections of the erstwhile suction tube may be filled into an empty ultimate storage container, as is shown in FIG. 11. One single container will accommodate the suction tubes of a plurality of storage containers. Upon placing the tube sections into the storage container, the container may be filled up with a matrix substance, such as e.g. cement, lead, glass, etc. before disposal.

The vacuum method described in the foregoing is suitable to completely empty a melting furnace prior to its shutdown.

If an ultimate storage container of the type shown in FIGS. 13 to 15 is used for receiving the glass melt, the conveyance of the glass melt takes place against the direction of gravity which imposes certain limits on the length of the storage container. Depending upon the density of the glass melt, the suction height in this case is a maximum of 2 to 3 meters.

When using ultimate storage containers of the type illustrated in FIGS. 1, 6, 7 and 16, the container may be placed on one side of the melting furnace during the filling operation, thereby utilizing also the force of gravity (siphon effect) for the conveyance of the glass melt, in addition to the reduced pressure existing in the storage container. In such case, the ultimate storage container may be of considerably greater length.

In the foregoing discussion, the assumption was made that the suction tube was an integral part of the ultimate storage container. However, it will be noted that the suction tube may also be fixedly installed in the melting furnace itself and project from the top of the furnace. In that case it is merely necessary to provide suitable coupling means to connect the ultimate storage container to the suction tube. An external heating of the suction tube is also required in this case.

The further assumption was made in the foregoing discussion, that the ultimate storage container was evacuated prior to lowering the suction tube into the melting chamber, or prior to connecting the storage container to the suction tube. However, it is also possible to connect the ultimate storage container to the suction tube prior to evacuation, or to first lower the suction tube of the storage container into the glass melt and then evacuate the storage container to start the filling operation by vacuum action.

The construction of the melting furnace illustrated in the drawings is such as to provide optimal safety measures against any unintentional discharge. From the furnace floor upward and above the level of the glass melt, there are no openings or apertures leading to the outside. The melting furnace is conceptually designed for optimum protection from leaks. Any necessary manipulations on the inlet opening are made from the top and above the level of the glass melt.

In conclusion, a working example will be given: An ultimate storage container was used having a length of 120 cm and an interior diameter of 11 cm. The material from which the container was made was high-grade steel type 304 L. The ultimate storage container was of the type shown in FIG. 13, being provided with a suction tube. The suction end of the suction pipe was sealed by a glass stopper produced by dipping the pipe end into liquid glass. Upon cooling of the stopper, the ultimate storage container was evacuated by means of a vacuum pump and was adjusted to a final interior pressure of less than 5 mbar.

Subsequently, the ultimate storage container with the suction tube pointing downwardly was lowered into a ceramic furnace holding a borosilicate glass melt to an extent that the suction tube was immersed in the melt a length of about 28 cm. The total depth of the glass charge was about 30 cm.

After approximately two minutes, the glass stopper in the suction opening of the pipe was melted and the glass melt was conveyed by suction action into the storage container. Within a period of approximately 5 minutes, the filling operation was completed. The ultimate storage container was filled with glass melt up to a height of about 100 cm, which corresponds to a filling rate of approximately 83%.

Thereafter, the ultimate storage container was raised up again and was slowly cooled.

What is claimed is:

1. Apparatus for filling an evacuated ultimate storage container with a glass melt containing highly radioactive waste material, comprising
    a glass melting furnace having an opening through a wall of said furnace to permit access to the molten glass within the furnace,
    an evacuated ultimate storage container adjacent said furnace,
    a filler tube integrally connected to said storage container at one end, and
    means for removably disposing the other end of said tube within said access opening,
        said other end being sealed with a glass stopper which melts upon immersion in said molten glass.
2. The apparatus of claim 1 which also includes a first pipe of greater diameter than said filler tube within said opening extending downwardly into the molten glass to provide a suction zone.
3. The apparatus of claim 2 which includes a second exhaust pipe communicating with the interior of said furnace and a branch pipe connecting said first pipe to said second pipe.
4. The apparatus of claim 1 in which said opening is provided with a yieldable closure member.
5. The apparatus of claim 4 in which said closure member is in the form of an iris diaphragm biased toward closing.
6. The apparatus of claim 1 in which said filler tube has spaced break points along its length thus being divisible into segments to facilitate disposal thereof.
7. The apparatus of claim 1 in which said stopper consists of a glass disc cemented to the end of said filler tube.
8. The apparatus of claim 1 including means connecting said container to a source of vacuum.

* * * * *